(12) United States Patent
Xie et al.

(10) Patent No.: US 8,516,060 B2
(45) Date of Patent: Aug. 20, 2013

(54) CALENDAR EVENT PROMPT SYSTEM AND CALENDAR EVENT NOTIFYING METHOD

(75) Inventors: Junqing Xie, Shanghai (CN); Ling Qian, Shanghai (CN)

(73) Assignee: Alcatel Lucent, Paris (FR)

( * ) Notice: Subject to any disclaimer, the term of this patent is extended or adjusted under 35 U.S.C. 154(b) by 333 days.

(21) Appl. No.: 12/735,587

(22) PCT Filed: Feb. 22, 2008

(86) PCT No.: PCT/CN2008/000384
§ 371 (c)(1),
(2), (4) Date: Jul. 29, 2010

(87) PCT Pub. No.: WO2009/103190
PCT Pub. Date: Aug. 27, 2009

(65) Prior Publication Data
US 2010/0312831 A1 Dec. 9, 2010

(51) Int. Cl.
*G06F 15/16* (2006.01)
(52) U.S. Cl.
USPC .......................................................... 709/206
(58) Field of Classification Search
USPC ................................. 709/204–207, 224–227
See application file for complete search history.

(56) References Cited

U.S. PATENT DOCUMENTS

| | | | |
|---|---|---|---|
| 7,035,923 B1 * | 4/2006 | Yoakum et al. | 709/224 |
| 2003/0023690 A1 * | 1/2003 | Lohtia | 709/206 |
| 2006/0273920 A1 * | 12/2006 | Doan et al. | 340/825.29 |
| 2008/0021918 A1 * | 1/2008 | Rao | 707/102 |
| 2009/0131088 A1 * | 5/2009 | Kirchmeier et al. | 455/466 |
| 2010/0107226 A1 * | 4/2010 | Grabelsky et al. | 726/4 |

FOREIGN PATENT DOCUMENTS

| | | |
|---|---|---|
| CN | 1688127 | 10/2005 |
| CN | 1829237 | 9/2006 |
| CN | 101090375 | 12/2007 |
| JP | 2001344200 | 12/2001 |
| JP | 2003348228 | 12/2003 |
| WO | 02097572 | 12/2002 |
| WO | 2006132921 | 12/2006 |

* cited by examiner

*Primary Examiner* — Chirag R Patel
(74) *Attorney, Agent, or Firm* — Carmen Patti Law Group, LLC

(57) ABSTRACT

The present invention relates to a calendar event notifying method for calendar event prompt system. The calendar prompt system includes a calendar server (101) and a plurality of supporting devices for connecting the calendar server (101) to a plurality of receivers of a user, the calendar event notifying method comprising: calculating step of calculating and generating a receiver list for the user (S301); sending step of sending an event notification message to one or more receivers listed in the receiver list (S302); determining step of determining whether the one or more receivers have returned at least one notification confirmation message in a pre-determined time (S303); removing step of removing the one or more receivers from the receiver list if none of the one or more receivers returns a notification confirmation message (S304); and repeating the sending step and the determining step until at least one receiver returns a notification confirmation message. The present invention also relates to associated calendar server and calendar prompt system.

16 Claims, 4 Drawing Sheets

CALENDAR EVENT PROMPT SYSTEM AND CALENDAR EVENT NOTIFYING METHOD

FIELD OF THE PRESENT INVENTION

This invention relates to network communications, and more specifically, relates to web-based calendar applications.

BACKGROUND OF THE PRESENT INVENTION

Calendar applications exist for a long time, especially in corporate Intranets. The most famous examples of calendar applications are Microsoft Outlook™ and IBM Lotus Notes/Domino™. A corporate user can set up a daily calendar, and prompt window will pop-up before a certain event (such as conference, meeting with clients, birthdays, or watching a performance, etc.) is about to happen, so that the user can attend that event on time. Such tools can even integrate with a corporate E-mail and conference system. However, for public Internet users (for example, tourist group, international/national conference attendee), there is no way to use such tools as they are only installed within corporate Intranets and not accessible for public domain users.

At the same time, web-based calendars, such as Google Calendar™, are developed for public users. A user can set up a calendar through a web browser, and a notification, which may take the form of pop-up window, reminder E-mail and/or short message, will be sent to the user before a certain event is about to happen. However, many of the current web-based calendars are only for individual users, and do not support team calendar well.

Besides, current calendar applications do not take user presence into consideration. If a user can not access his/her computer, pop-up window or E-mail will still be sent to the user, which results doubtlessly in resource waste as the user is not reminded.

Most importantly, with current calendar applications, for the team calendar, an administrator can not know whether a user (e.g. team member) has received a reminder successfully as there is no notification confirmation mechanism available.

Therefore, there exists a need for a team calendar which is not only suitable for public Internet users, but also for corporate Intranet users, which has the capability of "intelligently" determining the online state of a user (i.e. team member), and thereby immediately conveying a notification to the user through appropriate communication ways (pop-up window, short message, phone call, etc.), and which enables an administrator of the team calendar to master immediately whether team members have received the notification through a notification confirmation mechanism.

SUMMARY OF THE INVENTION

To overcome the shortcomings of the prior art, the invention provides an intelligent team calendar. The intelligent team calendar is designed for public Internet users, especially for team users. Such calendar may remind a user through multiple appropriate ways according to its own intelligence notification rules, and even if the user can not access his/her computer for some reason, the user can also be informed. The user may receive a notification by various kinds of software or apparatuses, e.g. browser pop-up window on computer (personal computer PC/laptop/personal digital assistant PDA/the like), Short Message Service/Multi-media Message Service (SMS/MMS) inbox on mobile phone, Public Switched Telephone Network (PSTN) phone. Furthermore, according to the intelligent team calendar of the invention, a notification confirmation mechanism is provided for an administrator of the team calendar, by which the administrator can easily learn whether team members have received the notification.

Thus, according to the above basic idea of the present invention, firstly a calendar event notifying method for a calendar event prompt system is provided, the calendar event prompt system including a calendar server and a plurality of supporting devices for connecting the calendar server to a plurality of receivers of a user, the calendar event notifying method comprising the steps: calculating step of calculating and generating a receiver list for the user; sending step of sending an event notification message to one or more receivers listed in the receiver list; determining step of determining whether the one or more receivers have returned at least one notification confirmation message in a pre-determined time; removing step of removing the one or more receivers from the receiver list if none of the one or more receivers returns a notification confirmation message; and repeating the sending step and the determining step until at least one receiver returns a notification confirmation message.

The calendar event notifying method according to the invention calculates and generates the receiver list preferably based on presence of the plurality of receivers of the user, priority of the event and/or preferences of the user.

Secondly, the invention provides a calendar server for a calendar prompt system, the calendar prompt system including the calendar server and a plurality of supporting devices for connecting the calendar server to a plurality of receivers of a user, the calendar server including: calculating module for calculating and generating a receiver list for the User and removing receivers from the receiver list; receiving/sending module for sending an event notification message to one or more receivers listed in the receiver list and receiving event notification confirmation; and determining module for determining whether the one or more receivers have returned at least one notification confirmation message in a pre-determined time.

Additionally, the invention further provides a calendar event prompt system including the above calendar server. The calendar event prompt system according to the invention corresponds to the calendar event prompt method according to the invention and to the calendar server according to the invention.

As compared to existing calendar systems, the invention has the following advantages:
  usable for both individual users and team users, especially aimed at team users;
  supporting use in both public Internet and corporate Intranets;
  utilizing intelligent notification rules (presence, priority and user preference)
  unified presence management;
  providing notification confirmation; and
  ubiquitous event notifying methods.

DETAILED DESCRIPTION OF THE EMBODIMENTS

A detailed description of one or more embodiments of the invention is provided in the following together with the accompanying drawings illustrating principles of the invention. Although the invention is described in connection with these embodiments, the invention is not limited to any embodiment. The scope of the invention is defined by the claims, and includes a variety of options, modifications, and equivalent substitutions. To fully understand the invention, many specific details are mentioned in the following description. These details are provided only for purpose of example, and the invention may be implemented according to the claims without some or all of these specific details. For clarity, the well known teachings in the technical art related with the invention will not be described in detail again so as not to obscure the invention unnecessarily.

Figure 1:
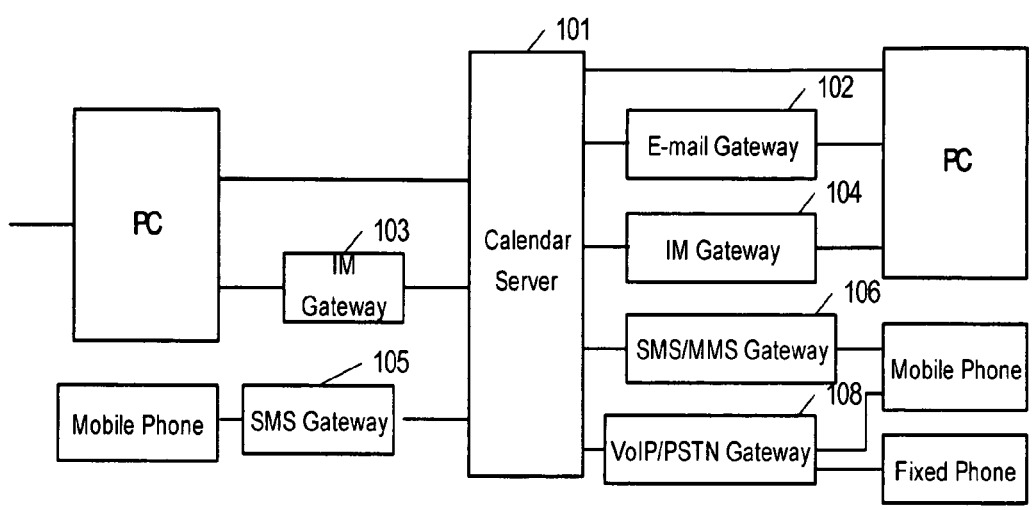
FIG. 1 shows a structure of an intelligent team calendar system according to the present invention.

FIG. 1 shows a structure of an intelligent team calendar system 100 according to the present invention. The intelligent team calendar system 100 according to the invention includes Calendar Server 101 and other supporting servers/gateways, such as Instant Messaging (hereinafter referred to as IM) Gateway 103 and SMS Gateway 105 on team calendar administrator side, and E-mail Gateway 102, IM Gateway 104, SMS/MMS Gateway 106, VoIP/PSTN Gateway 108 and the like on team members side. In this figure, E-mail Gateway 102 is connected to PC, and IM Gateway 104 is connected to an IM client of a user (team member). It should be noted that although the IM client is denoted by PC in FIG. 1, this is merely illustrative, and currently, IM applications may run not only on PCs or laptop computers, but also on mobile phones. SMS/MMS Gateway 106 is connected to mobile phones of team members, and VoIP/PSTN Gateway 108 is connected to mobile phones/fixed phones of the team members.

Calendar Server 101 is a core element of the intelligent calendar system according to the present invention. Calendar Server 101 is implemented on the basis of web server. It is in mainly charge of functions as team management, calendar management, calendar display and intelligent event notification. It utilizes other servers and gateways to perform all the event notification tasks. Thus, the team calendar proposed in the invention is still web-based. Both team calendar administrator and members can easily access the calendar through web browsers, which is the most popular way for different users.

Figure 2:
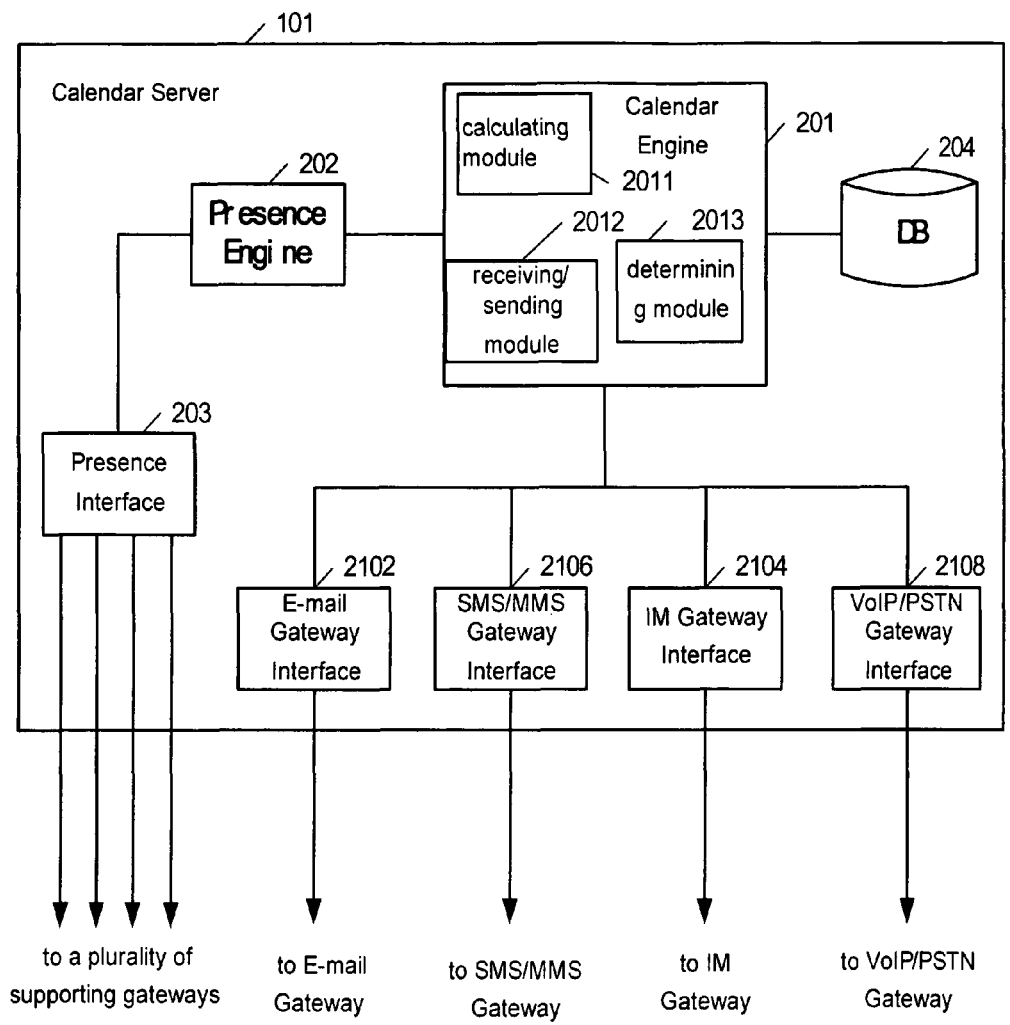
FIG. 2 shows a structure of an intelligent team calendar server according to an embodiment of the present invention.

According to a preferred embodiment of the present invention, FIG. 2 shows a structure of Calendar Server 101 according to the invention. Calendar Server 101 includes Calendar Engine 201, Presence Engine 202, Presence Interface 203, and Team Calendar Database 204. Besides, Calendar Server 101 also includes interfaces with a variety of supporting devices, such as Interface 2102 with E-mail Gateway 102, Interface 2104 with IM Gateway 104, Interface 2106 with SMS/MMS Gateway 106, and Interface 2108 with VoIP/PSTN Gateway 108. Presence Interface 203 is connected to E-mail Gateway 102, IM Gateway 104, SMS/MMS Gateway 106 and VoIP/PSTN Gateway 108, respectively, which gateways are respectively connected to a variety of receivers or so called user terminals of team members, i.e. PC, mobile phone, fixed telephone, etc. to receive presence, or more specifically, online information of the receivers via a variety of supporting devices (E-mail Gateway 102, IM Gateway 104, SMS/MMS Gateway 106 and VoIP/PSTN Gateway 108 in this embodiment).

To facilitate understanding and the following description, Calendar Engine 201 may be further divided into more detailed modules according to the basic principles of the invention, such as calculating module 2011, receiving/sending module 2012, and determining module 2013. Functions of these modules will be further specifically mentioned in the following description with reference to FIGS. 3 and 4.

It is evident, though not shown directly in FIG. 2, that Presence Interface 203 is also directly connected to the calendar application of the team members. If a team member opens the team calendar web page, the calendar information will be displayed on that page, and when it is necessary to send event notification to User and the page is still open, reminder window will pop-up, which is similar to other legacy web-based calendars.

As noted above, the limitation of the legacy calendars is that if this time a user (or team member) is not logged in the calendar web page, he/she would not receive the reminder in time. Besides, for the administrator, he/she does not know whether the user (or team member) has received this event notification. For a more important or more urgent event, if the team members are relatively decentralized, a considerable cost will be paid when the administrator wants to notify all members of the team of such event immediately.

Team calendar intelligent notification rules and a notification confirmation mechanism according to the present invention solve these problems well.

Before introducing the team calendar intelligent notification rules of the invention, it is necessary to describe functions of various supporting devices in the intelligent team calendar system 100 according to the invention in combination with FIGS. 1 and 2:

- E-mail Gateway 102: it provides a way for the team calendar to send event notification through E-mail and receive a delivery report;
- IM Gateway 104: it supports the communication with different external IM applications, such as MSN™, Yahoo™, QQ™, SkyPE™, Google™, etc., while providing a unified interface to Calendar Engine 201 so as to add/remove team members as buddies, obtain IM presence information and send event notification messages;
- SMS/MMS Gateway 106: it provides a way for the team calendar to send event notification to a team member through SMS/MMS to a mobile phone (cell phone) of the member and receive a delivery report. The choice between SMS and MMS is depending on the content of the event: for an event with only text, a SMS message is sent; while for an event containing multimedia content (such as pictures, sounds, etc.), a MMS message is sent; and
- VoIP/PSTN Gateway 108: it provides a way for the team calendar to send event notification to a team member through phone call to a mobile phone or PSTN phone of the member. In addition, it supports Text-to-Speech (TTS) mechanism so that the calendar event may be sent to the user's phone as voice.

The team calendar intelligent notification rules according to the invention will be described in the following in connection with a preferred embodiment of the present invention. The notification rules mainly including the following aspects:

First, consider the presence information of the user. Here the presence information of the user mainly refers to the online status of the user. As shown in FIG. 2, Presence Interface 203 is connected to gateways respectively to receive the presence information of receivers through these gateways and respective supporting devices. Presence Engine 202 is used to manage the presence of all of these receivers, including subscribing presence, retrieving presence and publishing presence to the calendar engine. Presence Engine 202 exposes a unified interface to the calendar engine, while has different ways to subscribe and retrieve the presence information of different kinds of receivers.

Currently, for legacy messaging (e.g. E-mail, SMS/MMS) and telephone networks, real-time presence information is generally not available. A default value for the presence may be set as "online", which means E-mail, SMS/MMS and phone calls are all available communication ways when sending event notification to users. The value could be modified by team members.

A PSTN network has the same problem. Strictly speaking, only when a notification call is made, even if the phone is busy at that time, we can determine that the phone is "available". Therefore, in the PSTN network, if a user expects to use his/her PSTN phone as the notification way, the default value for the presence may be set as "online".

For mobile devices, the presence information is more than online (free) and offline (busy, powered off or out-of-signal). Although location and user status (e.g. meeting) should be considered, they are currently not available on all mobile phones. Therefore, preferably, when different notification ways are used to notify team members, the mobile phone may be treated the same as the PSTN phone, however this is not limiting. With continuous development of mobile phone technology, location and user status may be considered.

For an IM network, team member presence may be obtained via existing IM protocols, such as MSN protocol. The typical procedure may be like this: (1) calendar IM software robot is created in the IM network; (2) the IM software robot subscribes to the presence of a team member; (3) the team member verifies and grants the privilege of subscribing to the presence to the calendar IM software robot; (4) when the team member changes his/her presence information, the software robot will get updated presence information.

For a team calendar web browser, the presence information is defined as: online if the calendar window is open; and offline if the calendar window is closed. The presence is retrieved by the browser from Calendar Server 101.

Presence Interface 203 and the unified presence management by Presence Engine 202 proposed by the present invention provide Calendar Server 101 with the capability of intelligently selecting different receivers to send event notification, and significantly reduce the load on Calendar Engine 201.

The team calendar intelligent notification rules according to the present invention not only use the presence information of the user, but also can integrate with the priority of an event to be notified. The team calendar administrator may set the event as low-priority event, normal event, as well as high-priority event, so that different notification mechanisms may be applied.

In addition, the team calendar intelligent notification rules may also take user preference into consideration. A user may choose his/her preferred receiver, e.g. a mobile phone, and set default presence information for some legacy receivers, for example, set the mobile phone as "online". When sending event notification, Calendar Server 101 will consider that SMS/MMS is usable and phone call is also useable.

Here are examples of some default notification rules:
Rule 1: Only try receivers specified in the user pre-set preference list.

A team member A may have each of the above listed receivers (PC, mobile phone, E-mail, etc.), and it is very likely when sending event notification, all of these receivers are "online" or available, while User A has pre-set the receivers in the preference list thereof as "SSM/MMS"; therefore, Calendar Server 101 (specifically, Calendar Engine 201) sends event notification to the mobile phone of User A only through SSM/MMS Interface 2106.

Rule 2: Try online receivers first. This rule is easy to understand. Even if a team member B sets his/her own preference as IM, presence information transferred from Presence Interface 203 and Presence Engine 202 to Calendar Engine 201 indicates explicitly that User B is currently not online for the IM network, while his/her mobile phone is in the "online" status, the intelligent team calendar system at this time will not transfer the event notification immediately to the team member B through the IM network, because it is obviously futile. If the event is urgent and requires immediate delivery, Calendar Server 101 will send the event notification directly via SMS/MMS Interface 2106 and/or Phone call Interface 2108 directly to the team member B, and in the end the selection between SMS/MMS and phone calls further depends on other factors, e.g. the priority of the event. If the event is a high-priority event, Calendar Server 101 may take the two ways concurrently to ensure that the team member B can receive the notification about the event.

Rule 3: Among all the online receivers, try free receiver first. For example, pop-up window, E-mail and IM are preferred as long as they are available and SMS/MMS and phone calls are backups.

Rule 4: For normal and low-priority event, a sequential notifying method with order is used. Event notification is sent in the order: pop-up window→IM→E-mail→SMS→phone calls, as long as notification confirmation (on which the details will be described below) has not been received after a period of time.

Rule 5: For high-priority event, the system will broadcast the event to all available receivers of each user at the same time, until one notification confirmation of the user is received. For a special case where the receivers of User are offline, the system will repeat the broadcast procedure in a pre-determined period of time.

Notification confirmation is quite important to the intelligent notification rules, and it is also important in the sense that the team calendar administrator learns whether the team member has noticed the event notification. Respective notification confirmations may be employed for different event notification ways. For example, for pop-up window, the notification is confirmed by clicking on the "OK" button of the window; otherwise no confirmation is made by the user. Of course, it is also the situation if a user is browsing the page of the team calendar but does not notice the pop-up window. For IM, confirmation is made by IM delivery report and user-reply to the message; otherwise no confirmation is made. For E-mail, confirmation is made by E-mail read receipt since most E-mail systems support reading feedback mechanism; otherwise no confirmation is made. For SMS/MMS, confirmation is made by SMS/MMS delivery report since operators generally support delivery report mechanism of SMS/MMS standard; otherwise no confirmation is made. For phone calls, one can click the confirm key (e.g. "0") on the phone pad in the prompt Interactive Voice Response (IVR) system.

The structure of the team calendar system 100 according to the invention, the structure of the team Calendar Server 101 according to the invention, the team calendar intelligent notification rules according to the invention, and the notification confirmation mechanism according to the invention are introduced respectively hereinabove. For better understanding of the invention, main operations which may be performed by the administrator and team members according to an embodiment of the invention are described below.

The intelligent team calendar system 100 according to the invention may perform 4 types of operations.

Team Management Operation.

The team management operation is performed by both the team calendar administrator and the team member. The team management operation may be performed through web portal, IM and SMS. Web portal is the major way, while IM/SMS is a backup way. SMS is used only when the user can not access his/her computer in certain cases. Both the administrator and team member should login into the system by inputting user name/password pairs. Then, the user can begin a team management session to perform all the operations allowed to him/her. It is the same case when SMS/IM is used, where multiple SMS/IM messages with different formats will occur, such as login messages and operation messages and the like.

For the team calendar administrator, the following operations may be performed:
1) Create Team: specify team information (description, empty member list) and store the team information in a database of the team calendar server.
2) Remove Team: remove all team members from the team and remove the team from the database.
3) Add User: specify user information (name, E-mail address, preferred IM account, mobile phone, and/or PSTN phone numbers) and store the user information in the database of the active team calendar server. The initial user name/password pair may be set in the operation.
4) Remove a user: remove a user from all teams where he/she is a member and remove the user from the database.
5) Assign User to Team as Member: select a user from the user database and add the user into the member list of the team.
6) Remove User from Team: remove the user from the member list of the team.
7) Set Team Member Preference: specify preferred notifying methods the user wants for different priority events. The possible notifying methods include pop-up window, IM, E-mail, SMS and phone calls. Multiple notifying methods may be specified for a single event, and all of these methods should be tried in sequence by the intelligent notification rules when the user should be reminded of certain events.
8) Set Team Member Presence: specify the default presence state of each legacy notifying method (E-mail, SMS and phone calls) for the team members.

For the team members, the following operations may be performed:
1) Register: it is similar to the "Add User" operation performed by the administrator. The user may add him/her into the system.
2) Un-register: it is similar to the "Remove User" operation performed by the administrator. The user removes him/her from the system.
3) Set Preference: it is similar to the "Set Team Member Preference" operation performed by the administrator.
4) Set Presence: it is similar to the "Set Team Member Presence" operation performed by the administrator.

First, Calendar Management.

The calendar management is performed by the team calendar administrator only. Similar to the team management, the operation may be performed through web portal, IM and SMS.
1) Add Event: specify starting time, end time, content, priority and reminding time of an event and store the event into the database. The operation may also refresh the web page of calendar display if the page is open.
2) Remove Event: remove the event from the database. The operation may also refresh the web page of calendar display if the page is open.
3) Modify Event: modify information of the event (starting time, end time, content, priority and reminding time) and store the new information into the database. The operation may also refresh the web page of calendar display if the page is open.
4) Set Event Notification Range: specify which team members the event should be sent to and store such information into the database.

Second, Calendar Display.

The operation is for displaying calendar information on the web page to the user. Whenever an event is added, removed or modified, the web page should be triggered to refresh itself for the update.

Third, Calendar Event Notification.

The intelligent event notification component in the active team server will send the event to appropriate team members with appropriate ways according to the event notification range, the current presence of the team members and the preference of the team members.

The team calendar event notifying method according to the invention is described in detail below in connection with FIG. 3. The figure illustrates the basic method for event notification according to the invention.

Assuming on a team calendar server with functions according to the above operations, the team calendar administrator has created team 1, including four members A, B, C, D, and the team calendar management method according to the invention will be described by example of A. Assuming according to pre-setting of the administrator, the event is a low-priority event, and preferences of User A are calendar pop-up window, IM, E-mail, SMS/MMS messages in sequence. The preferences of User A may be set by himself/herself or by the administrator, and may be modified at any time and stored into the team calendar database. As mentioned above, the administrator or User A may also set the default presence state for each of the legacy notifying methods, i.e. E-mail, SMS/MMS and phone calls, assuming that User A has already set E-mail, SMS/MMS messages in his/her own preferences as "online" by himself/herself, then when sending event notification, the two ways will be considered; otherwise they won't be considered under normal circumstances.

Now, a reminder message on some normal event will be sent, and the team calendar event method according to the invention will perform the following steps:

Presence information obtained from Presence Interface 203 is provided to Presence Engine 202, and the presence information may be real-time online information which Calendar Server 101 subscribes to from receivers or the receivers provide to Calendar Server 101. Assuming the presence at this time shows User A has logged in his team calendar application, while he does not use IM tool. Presence Engine 202 provides the presence information which it manages to Calendar Engine 201 through a unified interface. Meanwhile, Calendar Engine 201 learns that the event is a normal event by querying Team Calendar Database 204, and preferences of User A are calendar pop-up window, IM, E-mail and SMS/MMS messages in sequence, while legacy notification ways (E-mail, SMS/MMS) in the situation have been set as "online" (i.e. available) by User A.

Calendar Engine 201, specifically its calculating module 2011, will calculate the receiver list based on the above online information obtained in real time and pre-settings, i.e. step S301. The receiver list may be calculated according to the above default notification rules, or any other notification rules envisaged. According to the default notification rules, the receiver list comprises calendar pop-up window, E-mail, SMS/MMS messages in sequence.

The receiving/sending module 2012 of Calendar Engine 201 first sends event notification directly to calendar applications of User A, S302. Then, wait for user A's notification confirmation. Pop-up window will be present on User A's web page, and if User A sees this window in time and clicks on the window, then a notification confirmation message will be sent back directly to Calendar Engine 201, that is, "Yes" in the check box in the figure, and the administrator learns that User A has been aware of event notification, and the interaction with user A may end.

If pop-up window is present on User A's web page, but he/she leaves for some issues at this time and does not notice the event notification, then, after a certain time, for example 1 hour or 20 minutes (which is pre-set by the administrator, being common knowledge in the art, and no more description given here), in step S303, the determining module 2013 of Calendar Engine 201 will determine whether confirmation from the receiver is received. If User A has not yet confirmed by clicking on the pop-up window, i.e. "No" in the check box in the figure, Calendar Engine 201 will first remove pop-up window from the receiver list, S404, which means the pop-up window notification way fails currently, and then send event notification through the next receiver (i.e. E-mail) in the receiver list, that is, back to step S302 in the flowchart. The event notification is sent by the receiving/sending module 2012 of Calendar Engine 201 via E-mail Interface 2102 to E-mail Gateway 102, from where delivered to the user pre-specified E-mail box. If User A has read the mail in a pre-determined time, the E-mail system will automatically return a read receipt, which is sent back to the receiving/sending module of Calendar Engine 201 through E-mail Gateway 102 and E-mail Interface 2102, thereby the determining module 2013 knows that User A has sent notification confirmation, and consequently, the event notification-event confirmation process ends.

If User A does not respond with a read receipt, the calculating module 2011 of Calendar Engine 201 will remove E-mail way in the receiver list, i.e. step S304, and then will notify User A by the next communication way in the receiver list, i.e. SMS/MMS messages (back to step S301) and receive notification confirmation through SMS/MMS delivery report. Once the SMS/MMS delivery report is received (i.e. notification confirmation message), the event notification-event confirmation process ends.

A situation needs to be considered in the procedure of sending calendar event notification and waiting for confirmation: during the procedure of continually trying to send, such a situation where there is no available receiver in the receiver list is likely to occur, i.e. step S305. In this embodiment, after trying all the receivers listed in the receiver list one by one, Calendar Engine 201 has not received notification confirmation yet, then the receiver list is already empty at this time, which corresponds to "Yes" in the check box of "receivers list not empty" in FIG. 3, then the system (specifically, calculating module 2011 of Calendar Engine 201) will re-calculate and generate the receiver list according to the latest presence submitted by Presence Engine 202 at this time, for example, in this situation, calculate the receiver list to notify User A by considering only user presence and event priority rather than user preferences. For example, the presence indicates that User A is using the IM tool, and then the event notification is delivered to User A through instant messaging, and User A confirms through reply.

As a variant of this embodiment, the receiver list may also be updated or re-calculated after the pre-determined time has passed but not until all the receivers in the receiver list are tried once, for example, an emerging receiver is added into the receiver list according to the latest presence of the user receiver submitted by Presence Engine 201.

Of course, those skilled in the art may also envisage other situations. For example, in the initial establishment of the receiver list of the user, a situation where the receiver list is empty is likely to occur. For example, when User A has his/her own preferences set as "IM", meanwhile default states of "E-mail", "SMS/MMS" and "phone call" are set as "offline" (i.e. not available), but he/she does not use the IM tool. If presence, preferences, and event priority are comprehensively considered, the receiver list established at this time is empty, that is, there is no available receiver. Then, the intelligent calendar engine according to the invention may intelligently determine a way for notifying according to the latest presence gathered by Presence Interface 203 and submitted by Presence Engine 202, for example, User A has logged into the team calendar at this time, then sending calendar event pop-up window directly to User A will be the simplest and quickest solution.

Therefore, according to the preferred embodiment of the invention, when the administrator or team member pre-sets preferences, it should be ensured that at least one receiver is available.

Figure 4:
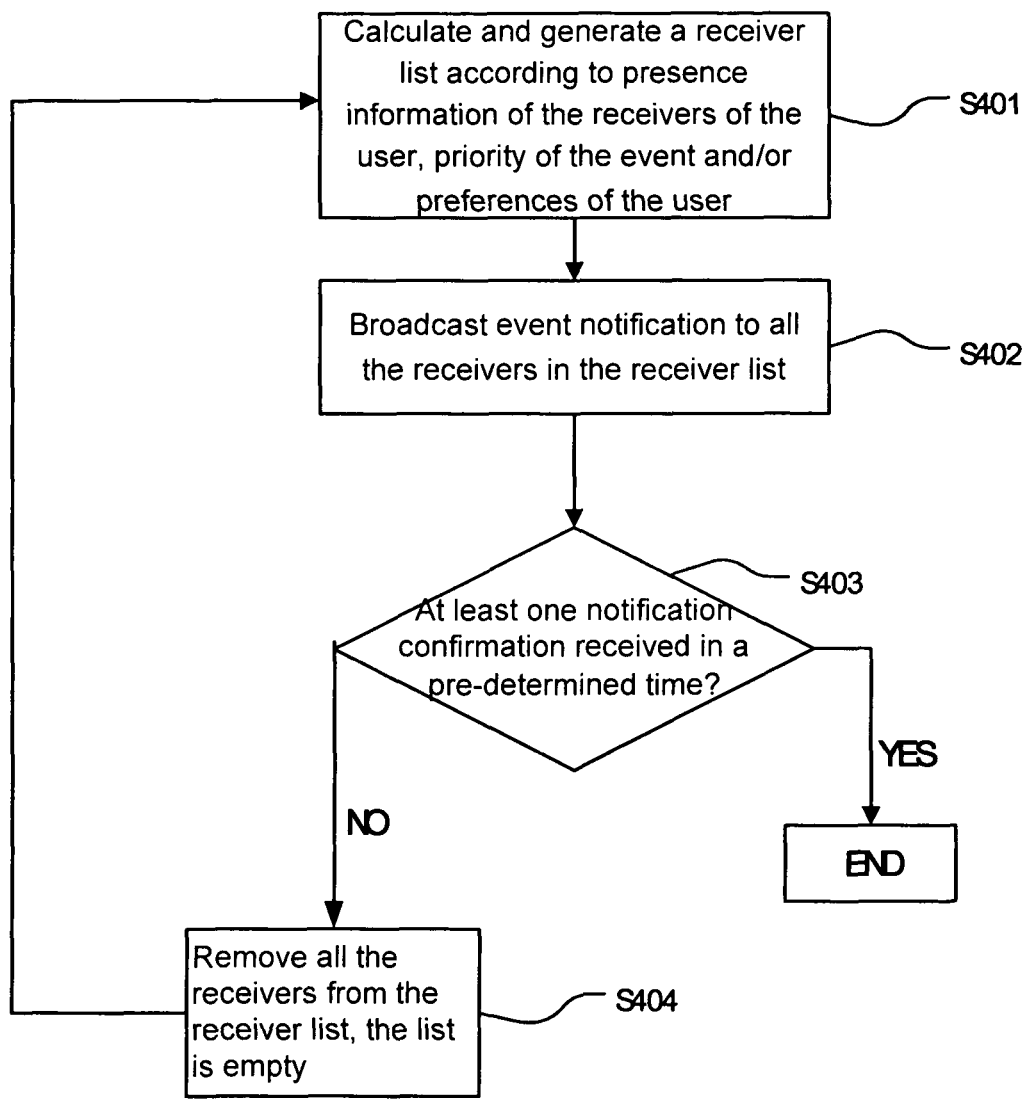
FIG. 4 shows a flowchart of an intelligent team calendar prompt method according to another embodiment of the invention.

Another embodiment of the team calendar event notifying method according to the invention is described in detail below in connection with FIG. 4.

Similarly, assuming on the team calendar server with functions according to the above operations, the team calendar administrator has created team 1, including four members A, B, C, D, and the team calendar management method according to the invention will be described by example of A. Assuming according to the administrator's pre-settings, the event is a high-priority event, other situations being same as the embodiment described with reference to FIG. 3. User A's preferences are calendar pop-up window, IM, E-mail, SMS/MMS messages in sequence. User A has already set E-mail and SMS/MMS messages in his/her own preferences as "online".

Now, a reminder message on the high-priority event will be sent, and the team calendar event method according to the invention will perform the following steps:

The presence information obtained from Presence Interface 203 is provided to Presence Engine 202. Assuming the presence at this time shows User A has logged into his the team calendar application, but he does not use the IM tool. Presence Engine 202 provides the presence information which it manages to Calendar Engine 201 through a unified interface. Meanwhile, Calendar Engine 201 learns that the event is a high-priority event by querying the Team Calendar Database 204, and preferences of User A are calendar pop-up window, IM, E-mail, SMS/MMS messages, while legacy notification ways (E-mail, SMS/MMS) in the situation have been set by User A as "online" or in other words, available.

Calendar Engine 201 will calculate and generate the receiver list based on the above online information obtained in real time and pre-settings. The receiver list may be calculated and generated according to the above default notification rules, or any other notification rules envisaged. According to the default notification rules, the receivers in the receiver list include calendar pop-up window, E-mail and SMS/MMS messages.

As the calendar event is a high-priority event, the calculating module 2011 of Calendar Engine 201 calculates and generates a receiver list, and lists all the available apparatuses of User A in the receiver list, as shown in step S401. Then the receiving/sending module 2012 of Calendar Engine 201 broadcasts event notification to all available receivers of User A, i.e. all the receivers in the receiver list at this time, as shown in step S402. Pop-up window will be present on the web page of User A, the E-mail box of User A will receive E-mail about the event notification, and the mobile phone of User A will receive a notification message of the event. After broadcasting the event notification message, Calendar Server 101 will wait and gather User A's notification confirmation in a specific time period set by the administrator, i.e. step S403. Then, the determining module 2013 of Calendar Engine 201 determines whether at least one notification confirmation message has been received in a pre-determined period of time, S403. If User A sees this window in time and clicks on the window, or the system returns to Calendar Server 101 a read receipt after User A opens E-mail, or user A's mobile ph replies to Calendar Server 101 with SMS/MMS message delivery report, as long as any one of the three conditions is met in a specific time, then it is known that User A has received event notification, thereby, the notification-confirmation process terminates.

Figure 3:
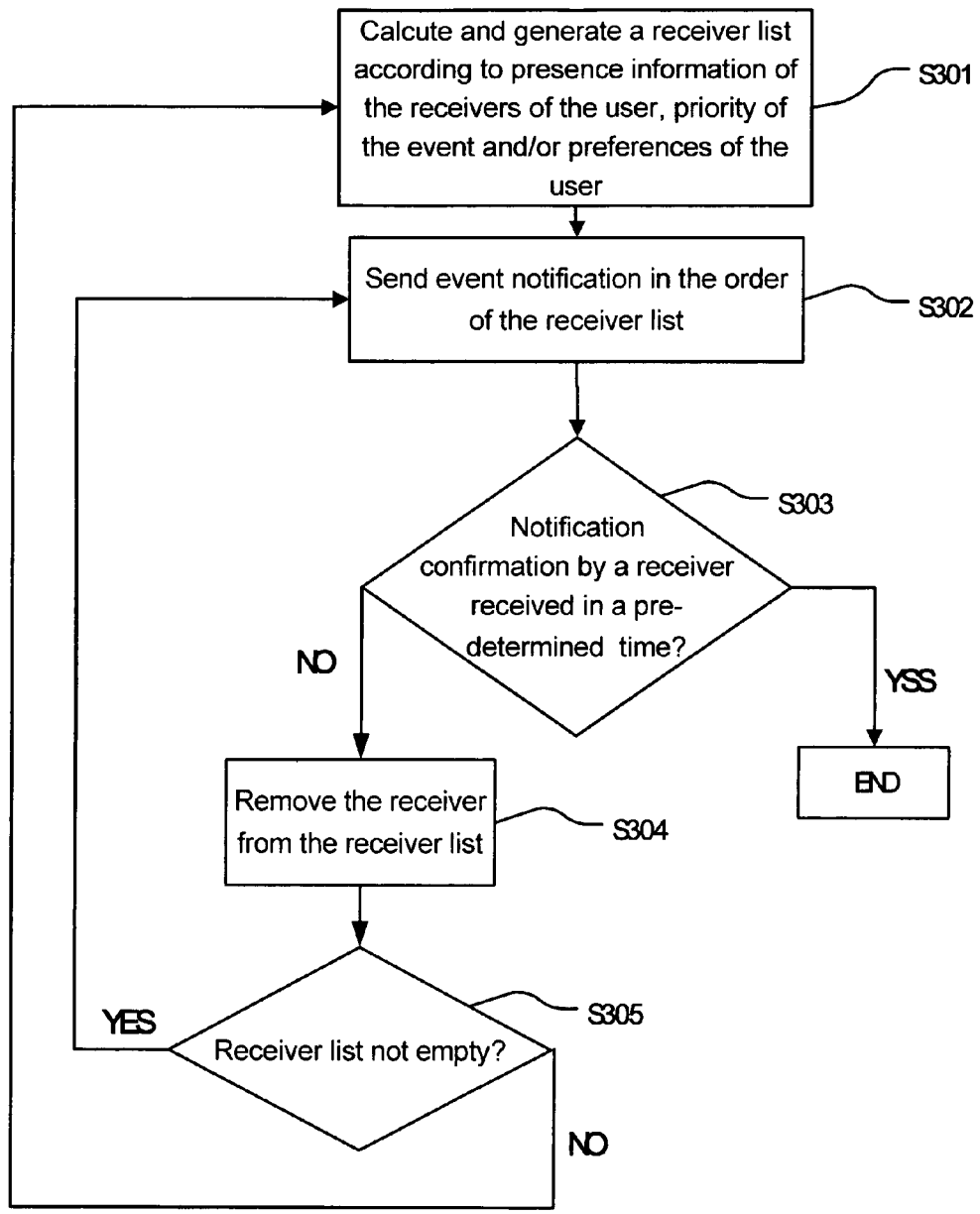
FIG. 3 shows a flowchart of an intelligent team calendar prompt method according to an embodiment of the present invention.

If in a specific time period, Calendar Server 101 (or more specifically, Calendar Engine 201) has not received notification confirmation from any one receiver in the receiver list, i.e. "No" in the check box, all the receivers in the receiver list are removed (because notification has been sent to all the receivers in the receiver list, with no confirmation received), i.e. S404, which corresponds to the case in FIG. 3 where the receiver list is empty. The calculating module 2011 of Calendar Engine 201 will get the presence information of other receivers of User A through Presence Engine 202 and Presence Interface 203, and recalculate the receiver list by adding them into the receiver list, that is, back to step S401. Then, broadcast event notification to receivers in the new receiver list (S402) and wait for confirmation (S403). If notification confirmation is received from any one of these receivers, the process ends. Or in order to ensure that User A can receive confirmation, other receivers not online may also be added into the receiver list; then the receiving/sending module of Calendar Engine 201 broadcasts event notification again until at least one confirmation message is received.

Although the principles of the invention have been described in connection with particular devices and particular implementation details, it should be understood that the description is made by way of example, not limiting the scope of this invention. By considering the basic principles and embodiments of the invention, other embodiments of the invention will become obvious to those skilled in the art. The scope of the present invention is defined by the accompanying claims.

What is claimed is:

1. A calendar event notifying method for a calendar event prompt system, the calendar event prompt system comprising a calendar server and a plurality of supporting devices operable to connect the calendar server to a plurality of receivers of a user, the calendar event notifying method comprising the steps of:

calculating and generating a receiver list for the user;
sending an event notification message to one or more receivers listed in the receiver list;
determining whether the one or more receivers have returned at least one notification confirmation message in a pre-determined time period;
removing the one or more receivers from the receiver list if none of the one or more receivers returns a notification confirmation message; and
repeating the sending step and the determining step until at least one receiver returns a notification confirmation message;
wherein in the removing step, if the receiver list is empty, a receiver list is re-calculated and generated for the user according to the latest presence information of the one or more receivers.

2. The calendar event notifying method according to claim 1, wherein the calculating step further comprises the step of calculating and generating the receiver list according to presence information of the one or more receivers of the user, priority of the event and/or preferences of the user.

3. The calendar event notifying method according to claim 1, wherein the receiver is a calendar client and/or instant messaging client and/or E-mail terminal and/or Short Message System/Multi-media Message System (SMS/MMS) terminal and/or Voice over IP/Public Switched Telephone Network (VoIP/PSTN) terminal.

4. The calendar event notifying method according to claim 1, wherein the presence information comprises real-time online information of the receiver.

5. The calendar event notifying method according to claim 1, wherein the presence information comprises default presence information set by the user for receivers of the user.

6. The calendar event notifying method according to claim 1, wherein the priority of the event is set by an administrator of the calendar event prompt system.

7. The calendar event notifying method according to claim 1, wherein the preferences of the user are set by the administrator of the calendar event prompt system or the user.

8. The calendar event notifying method according to claim 1, wherein the plurality of supporting devices are instant messaging gateway and/or E-mail gateway and/or SMS/MMS gateway and/or VoIP/PSTN gateway.

9. The calendar event notifying method according to claim 1, wherein the step of sending the event notification message comprises the step of:

broadcasting the event notification to each receiver for the user in the receiver list at the same time.

10. A calendar server for a calendar event prompt system, the calendar system comprising the calendar server and a plurality of supporting devices operable to connect the calendar server to a plurality of receivers of a user, the calendar server comprising:

a calculating module operable to calculate and generate a receiver list for the user and removing the receivers from the receiver list;
a receiving/sending module operable to send an event notification message to one or more receivers listed in the receiver list and receive event notification confirmation; and
a determining module operable to determine whether the one or more receivers have returned at least one notification confirmation message in a pre-determined time;
wherein the calculating module is operable to remove the one or more receivers from the receiver list if none of the one or more receivers returns a notification confirmation message;
wherein the receiving/sending module and determining module are operable to repeat the sending of event notification messages and determining whether the one or more receivers have returned the at least one notification confirmation message until at least one receiver returns a notification confirmation message;
wherein if the receiver list is empty, the calculating module is operable to re-calculate and generate the receiver list for the user according to the latest presence information of the one or more receivers.

11. The calendar server according to claim 10, wherein the calculating module is operable to calculate and generate the receiver list according to presence information of the one or more receivers of the user, priority of the event and/or preferences of the user.

12. The calendar server according to claim 10, wherein the receiver is a calendar client and/or instant messaging client and/or E-mail terminal and/or SMS/MMS terminal and/or VoIP/PSTN terminal.

13. The calendar server according to claim 10, wherein the presence comprises real-time online information of the receiver.

14. The calendar server according to claim 10, wherein the presence further comprises default presence set by the user for receivers of the user.

15. The calendar server according to claim 10, further comprising a Presence Interface operable to obtain the presence information of the plurality of receivers and a Presence Engine operable to manage the presence information and to provide the presence information to the calculating module in a unified way.

16. The calendar server according to claim 10, wherein the receiving/sending module is operable to broadcast the event notification to each receiver for the user in the receiver list at the same time.

* * * * *